United States Patent [19]
Reinhardt et al.

[11] 3,907,497
[45] Sept. 23, 1975

[54] CATALYSIS WITH ODOR FREE HYDROXYMETHANESULFONIC ACID IN THE FINISHING OF CELLULOSIC TEXTILES

[75] Inventors: Robert M. Reinhardt, New Orleans; Russell M. H. Kullman; Norton A. Cashen, both of Metairie; John D. Reid, New Orleans, all of La.

[73] Assignee: The United States of America as represented by the Secretary of Agriculture, Washington, D.C.

[22] Filed: Oct. 10, 1973

[21] Appl. No.: 404,975

[52] U.S. Cl. .................... 8/184; 8/115.7; 8/185; 8/186; 8/187
[51] Int. Cl.$^2$............... D06M 9/00; D06M 13/34
[58] Field of Search ............... 8/184, 185, 186, 187

[56] References Cited
OTHER PUBLICATIONS

Textile Research Journal, February 1972, pp. 89–96.
Textile Research Journal, April 1968, pp. 401–415.
Textile Chemist and Colorist, Vol. 1, No. 11, May 21, 1969, pp. 7–8.

Primary Examiner—Benjamin R. Padgett
Assistant Examiner—Donald P. Walsh
Attorney, Agent, or Firm—M. Howard Silverstein; Max D. Hensley

[57] ABSTRACT

The preparation of odorless hydroxymethanesulfonic acid by reaction of equivalent amounts of sulfurous acid and paraformaldehyde is disclosed. This sulfur dioxide odor free sulfurous acid based substance is an excellent catalyst for the treatment of cellulose with N-methylol-type finishing agents to produce durable press properties. Its use offers several advantages over the use of hydroxymethanesulfonic acid prepared in situ in the pad bath by addition of sulfurous acid to react with the free formaldehyde present. Exact quantities of the catalyst can be dispensed and workers are not exposed to the discomfort and health hazard of the choking, noxious fumes of sulfur dioxide that are given off by sulfurous acid.

8 Claims, No Drawings

CATALYSIS WITH ODOR FREE HYDROXYMETHANESULFONIC ACID IN THE FINISHING OF CELLULOSIC TEXTILES

This invention relates to a process of preparing a sulfurous acid derived catalyst that has no noxious sulfur dioxide odor nor $HSO_3^-$ cation and that is suitable for use in durable press finishing processes. Specifically the invention relates to forming hydroxymethanesulfonic acid ($HOCH_2SO_3H$) by reaction of equivalent quantities of paraformaldehyde and sulfurous acid. This product is odor free. Further, the invention relates to employing the hydroxymethanesulfonic acid as the catalyst in the absence of sulfurous acid and the $HSO_3^-$ cation associated with this acid for treatments with N-methylol finishing agents to produce durable press properties in cellulose containing textile materials.

100% conversion of sulfurous acid to hydroxymethanesulfonic acid is affected through reaction with paraformaldehyde. The product is then suitable for employment as a catalyst in treatments with N-methylol finishing agents to impart durable press properties to cellulose containing textiles.

In the treatment of cellulose containing fabrics, sulfurous acid may be employed to promote reaction between N-methylol type crosslinking agents and cellulose. In such usage, the sulfurous acid partially reacts with free formaldehyde present in the solution of the N-methylol agent to give hydroxymethanesulfonic acid. Incomplete reaction results in a mixture of catalysts in the treatment bath, namely the sulfurous acid with its attendant $HSO_3^-$ cation and noxious sulfur dioxide odor and the hydroxymethanesulfonic acid.

The strong, choking, disagreeable odor of sulfur dioxide which is given off by sulfurous acid causes extreme discomfort to those employing solutions containing the acid and the fumes are a health hazard. This noxious odor occurs in finishing solutions even in the presence of free formaldehyde that is found in most M-methylol agents employed to crosslink cellulose because of incomplete conversion of the sulfurous acid to hdyroxymethanesulfonic acid. The presence of free formaldehyde permits reaction between it and sulfurous acid to produce hydroxymethanesulfonic acid. Large excesses of free formaldehyde, however, are required to accomplish 100% conversion of the sulfurous acid to hydroxymethanesulfonic acid and complete conversion is not achieved by in situ formation in these finishing solutions. This results in noxious choking odors (characteristic of sulfur dioxide which is given off from the sulfurous acid) being emitted from: finishing solutions; fabrics impregnated with these finishing solutions; and from drying and curing ovens in which impregnated fabric is heated to effect crosslinking.

In the prior art Keating and coworkers, Textile Chemists and Colorists, Vol. 1, 1969, No. 11, page 7, have reported the use of sulfurous acid and formalin in an aqueous treatment solution. These workers prepared hydroxymethanesulfonic acid in situ and used it as a formaldehyde donor to crosslink cellulose. It is obvious to those who practice this procedure that the strong noxious odor of sulfurous acid is present and is most disagreeable. This is readily understandable for the concentrations of sulfurous acid, as represented by the concentration of sulfur dioxide in their tables, are not sufficient to product complete conversion to hydroxymethanesulfonic acid with the quantity of formalin used to provide formaldehyde in the pad baths. Thus a mixture of the two acids is present.

Other such as Wilson and coworkers, Textile research Journal, Vol. 38, 1968, page 401, have used gaseous techniques employing noxious sulfur dioxide and formaldehyde in finishing cellulose containing textiles. None of these workers have avoided the strong disagreeable choking odors prevalent in their processes even though hydroxymethanesulfonic acid was present.

We have found unexpectedly, however, that by forming hydroxymethanesulfonic acid through reaction of equivalent amounts of sulfurous acid and paraformaldehyde, the noxious sulfur dioxide odors are eliminated. Furthermore, it has been found, that this hydroxymethanesulfonic acid, so prepared, exhibits greater efficiency as a catalyst then a mixture of sulfurous acid and hydroxymethanesulfonic acid in durable press treatments of cellulose. It is surprising to learn that large excesses of paraformaldehyde are not required but that equimolar quantities of paraformaldehyde and sulfurous acid are sufficient to give hydroxymethanesulfonic acid quantitatively. Produced in this way hydroxymethanesulfonic acid is free from noxious odors. We have discovered that physical form of formaldehyde used in preparation of hydroxymethanesulfonic acid affects extent of reaction with sulfurous acid. In order to achieve a sulfur dioxide free odorless product, paraformaldehyde (and not formalin, trioxane nor tetraoxocane) must be employed. This method of preparation of the acid also precludes the formation or presence of any $HSO_3^-$ cation in the finishing bath. The comparative stability of the hydroxymethanesulfonic acid to sulfurous acid in the presence of formaldehyde is believed due to the absence of the $HSO_3^-$ cation and the reactivity of sulfurous acid to formaldehyde.

Therefore, it is an object of this invention to provide a process for the preparation of a catalyst derived from sulfurous acid that is free of this acid and its noxious choking odors of sulfur dioxide. It is a further object of this invention to produce durable press properties in cellulose-containing textiles through pad-dry-cure treatments employing said odor free catalyst in the absence of sulfurous acid. A third object of this invention is to produce durable press properties in cellulose-containing textiles through a one-step mild cure process.

The first objective is achieved by complete conversion of sulfurous acid to hydroxymethanesulfonic acid, through reaction with an equivalent amount of paraformaldehyde. The second objective is achieved by applying this product as catalyst in the absence of sulfurous acid with an N-methylol finishing agent to a cellulose-containing textile and then drying and curing the finish on the textile in separate steps to achieve durable press properties. The third objective is achieved by applying said catalyst in the absence of sulfurous acid with an N-methylol finishing agent to a cellulose-containing textile and then curing the finish on the textile in one step.

With elimination of the noxious, choking odors produced by sulfurous acid, use of the hydroxymethanesulfonic acid does not require extra care in handling or special processing methods to avoid pollution of the surrounding atmosphere during preparation of treatment baths containing the improved catalyst. Neither are extra precautions for workers required to avoid inhalation of noxious fumes during application of finishing solutions to textile materials, or during subsequent drying and curing operations to accomplish final finishing of the fabric.

Textile materials which can be treated by the processes of this invention include cellulose fibers, yarns, fabrics and the like. The fabrics can be woven, knitted, or nonwoven. The cellulose may be natural, such as cotton, linen, ramie, and the like, or regenerated, such as viscose and other types of rayon. In addition to textile materials consisting wholly of cellulose, blends of cellulose fibers and synthetic fibers can be treated. Among these, a particularly amenable type of blend is that containing cotton and polyester fibers.

N-Methylol type finishing agents that can be used include formaldehyde adducts of urea, modified ureas, such as ethyleneureas, dihyroxyethyleneureas, propyleneureas, urons, triazones, and the like, triazines, and carbamates. N-Alkoxymethyl derivatives of these nitrogeneous substances also can be used. These agents can be used in amounts varying about from 3 to about 20%, by weight, based upon the weight of the treatment bath. About from 9 to 15% of N-methylol or N-alkoxymethyl finishing agent is preferred.

The odor free hydroxymethanesulfonic acid is a very active catalyst for textile finishing treatments and can be used in a wide range of concentrations. Concentrations that can be employed include about from 0.01 to about 1 part of this acid per 100 parts by weight of treatment solution. A preferred range of concentrations is about from 0.04 to about 0.2 parts of the hydroxymethanesulfonic acid per 100 parts of treatment solution. The hydroxymethanesulfonic acid can be used as catalyst in finishing treatments for textiles that require an acid or latent acid catalyst. Among such treatments are those which produce durable press properties in textile materials, such as the well-known pad-dry-cure process and the mild cure finishing process.

In summary, the use of hydroxymethanesulfonic acid as catalyst has several advantages over the use of sulfurous acid to give partial conversion to hydroxymethanesulfonic acid in situ in the finishing treatment bath. By employing hydroxymethanesulfonic acid prepared according to this invention, exposure of personnel to noxious, irritating fumes from sulfurous acid is avoided. The hydroxymethanesulfonic acid has a longer shelf life than less soluble, more volatile, more unstable sufluorous acid. Use of hydroxymethanesulfonic acid permits exact amounts of the catalyst to be dispensed. When prepared in situ in the pad bath, the reaction of sulfurous acid and formaldehyde is not complete and $HSO_3^-$ cations are present. Thus, the concentration of hydroxymethanesulfonic acid is less than denoted by the reaction equation for the amount of sulfurous acid added and is not known exactly. Unreacted sulfurous acid is readily decomposed to noxious, choking sulfur dioxide in the subsequent textile processing operations. Hence, in finishing treatments catalyzed by hydroxymethanesulfonic acid and by amounts of sulfurous acid theoretically sufficient to yield equivalent amounts of hydroxymethanesulfonic acid in situ, the hydroxymethanesulfonic acid prepared by paraformaldehyde gives finished fabrics with better durable press properties.

For illustration of the invention, detailed and specific examples are given with preferred embodiments. The instant invention is not to be construed as limited in scope by these illustrations and numerous changes and modifications within the spirit of the invention will become apparent to those skilled in the art.

EXAMPLE 1

To 100.5 grams of aqueous solution containing 6.3 grams (0.077 mole) of sulfurous acid was added 2.3 grams (0.077 mole) of paraformaldehyde. After dissolution at room temperature, the theoretical concentration of the hydroxymethanesulfonic acid was 8.4% (wt./wt.).

Weighed portions of the hydroxymethanesulfonic acid solution were analyzed by titration with standarized sodium hydroxide solution. The concentration found by analysis was 8.4% (wt./wt.) showing 100% conversion of the sulfurous acid to hydroxymethanesulfonic acid.

The absence of sulfurous acid was obvious as no strong, noxious, penetrating, disagreeable, choking odor of sulfur dioxide could be detected. The hydroxymethanesulfonic acid prepared was odorless.

Substitution of 0.077 mole of trioxane or 0.077 mole of tetraoxocane for 0.077 mole of paraformaldehyde in the above reaction with sulfurous acid was made. Each of these products had very strong odors of sulfur dioxide.

This demonstrates that of the various physical forms of formaldehyde available for reaction with sulfurous acid only paraformaldehyde is unique in obtaining an odor free hydroxymethanesulfonic acid.

EXAMPLE 2

Formaline, containing 37% formaldehyde, was added in various molar equivalents to sulfurous acid, and allowed to react for 24 hours. Weighed portions of the resultant solutions were analyzed for conversion of the sulfurous acid to hydroxymethanesulfonic acid by titration with standarized sodium hydroxide solution. Results are shown in Table I.

TABLE I

| Molar Equivalents of HCHO Provided by Formalin Added Per Mole of $H_2SO_3$ | % Conversion to Hydroxymethanesulfonic Acid |
|---|---|
| 1 | 72 |
| 5 | 82 |
| 20 | 89 |

It is readily seen that a substantial proportion of sulfurous acid has not been converted to hydroxymethanesulfonic acid with equimolar amounts of the reactants. Even large excesses of formaldehyde, as provided by formalin, are not sufficient for complete conversion of sulfurous acid to hydroxymethanesulfonic acid.

EXAMPLE 3

Aqueous solutions (100 g.) were prepared to contain 10% (by weight) of dimethylol methyl carbamate, and 0.004 – 0.002 mole (0.03–0.014%) of sulfurous acid. In addition, each solution contained 0.0393 mole of free formaldehyde due to its presence in the carbamate reagent used. Theoretically, the free formaldehyde was more than adequate to convert the sulfurous acid to hydroxymethanesulfonic acid.

A second series of solutions was prepared similarly to contain 10% dimethylol methyl carbamate but with 0.0004 – 0.002 mole (0.04–0.2%) of odor free hydroxymethanesulfonic acid (prepared as described in Example 1) present instead of the sulfurous acid.

These solutions are identified by letters A – J in Table II. Odor observations are given for each solution in the table.

TABLE II

| Solution Designation | Acid Added | Odor Observation |
|---|---|---|
| A | 0.0004 mole $H_2SO_3$ | Slight Choking, disagreeable |
| B | 0.0007 mole $H_2SO_3$ | Choking, disagreeable |
| C | 0.0011 mole $H_2SO_3$ | Strong choking, disagreeable |
| D | 0.0014 mole $H_2SO_3$ | Very strong choking, disagreeable |
| E | 0.002 mole $H_2SO_3$ | Very strong choking, disagreeable |
| F | 0.0004 mole $HOCH_2SO_3H$ | Slight formaldehyde |
| G | 0.0007 mole $HOCH_2SO_3H$ | Slight formaldehyde |
| H | 0.0011 mole $HOCH_2SO_3H$ | Slight formaldehyde |
| I | 0.0014 mole $HOCH_2SO_3H$ | Slight formaldehyde |
| J | 0.002 mole $HOCH_2SO_3H$ | Slight formaldehyde |

These odor observations show that the addition of hydroxmethanesulfonic acid prepared as in Example 1 to a solution containing a cellulosic finishing agent obviates the noxious odors characteristic of sulfurous acid that are present when sulfurous acid is added directly to the treatment bath. In the latter case, there is incomplete conversion of the sulfurous acid to hydroxymethanesulfonic acid and the unreacted sulfurous acid in the solution can present undesirable olfactory responses. The advantages of handling solutions containing hydroxymethanesulfonic acid prepared in Example 1 in textile finishing plants are obvious.

EXAMPLE 4

The solutions prepared in Example 3 were used to treat cellulose containing fabric to impart improved durable press performance. Swatches of cotton printcloth were padded to about 80% wet pickup with Solutions A through J. The samples were dried for 7 minutes at 60° C. and cured for 3 minutes at 120° C. After curing, the swatches were washed, dried and durable press ratings were determined by the procedure of the American Association of Textile Chemists and Colorists, AATCC Test Method 124-1967 (AATCC Technical Manual, Volume 46, pages 177–8, 1970). Results are given in Table III.

TABLE III

| Treatment Solution | Durable Press Rating | |
|---|---|---|
| | Tumble Dried | Line Dried |
| A | 1.0 | 1.0 |
| F | 1.2 | 1.2 |
| B | 2.0 | 2.2 |
| G | 3.4 | 2.9 |
| C | 3.9 | 3.3 |
| H | 4.4 | 4.0 |
| D | 4.4 | 4.0 |
| I | 4.7 | 4.6 |
| E | 4.7 | 4.2 |
| J | 5.0 | 4.3 |

In every instance solutions prepared with hydroxymethanesulfonic acid prepared as in Example 1 (Solutions F, G, H, I, and J) produced higher durable press ratings than those solutions prepared with sulfurous acid added directly to the treatment bath (Solutions A, B, C, D, and E).

EXAMPLE 5

A 100 gram solution was prepared containing 15% (wt./wt.) dimethylol methyl carbamate (which also contained 0.059 mole free formaldehyde) and 0.0014 mole of sulfurous acid. This solution is identified as Solution K.

A similar 100 gram solution was prepared containing 15% (wt./wt.) dimethylol methyl carbamate and 0.0014 mole of hydroxymethanesulfonic acid (prepared as in Example 1). This solution is identified as Solution L.

Swatches of cotton printcloth were padded to about 100% wet pickup with Solutions K and L. The swatches were then cured for 2½ minutes at 100° C. Curing at this low temperature with no pre-drying is commonly referred to as mild cure finishing (cf. Textile Chemist & Colorist, vol. 2, p. 337–340, Sept. 23, 1970).

The treated samples were then washed, dried and durable press ratings were determined as in Example 4. In Table IV are results of the mild cure finished fabrics. Ratings in each instance were higher for fabric treated with Solution L which contained hydroxymethanesulfonic acid than that treated with Solution K which contained sulfurous acid.

TABLE IV

| Treatment Solution | Durable Press Rating | |
|---|---|---|
| | Tumble Dried | Line Dried |
| K | 3.3 | 3.2 |
| L | 3.7 | 3.7 |

EXAMPLE 6

A 150-gram solution was prepared containing 9% (wt./wt.) dimethylol dihydroxymethyleneurea (which also contained 0.006 mole free formaldehyde) and 0.14% (0.0026 mole) of sulfurous acid. This solution is identified as Solution M. The amount of free formaldehyde present was more than twice the quantity theoretically sufficient for in situ conversion of the sulfurous acid to hydroxymethanesulfonic acid.

A similar 150-gram solution was prepared containing 9% (wt./wt.) dimethylol dihydroxyethyleneurea and 0.2% (0.0026 mole) of hydroxymethanesulfonic acid (prepared as in Example 1). This solution is identified in Solution N.

A third 150-gram solution was prepared containing 10% (wt./wt.) dimethylol methyl carbamate and 0.2% (0.0026 mole) of hydroxymethanesulfonic acid (prepared as in Example 1). This solution is identified as Solution O.

Fabrics containing 100%, 50%, and 35%, respectively, by weight, of cotton fiber with the remaining percentage being polyester fiber, were padded to about 100% wet pickup with Solutions M and N. The fabrics were dried for 7 minutes at 60° C. and cured for 3 minutes at 120° C. After curing, the fabrics were washed, dried, and evaluated for durable press ratings after tumble drying as in Example 4.

Other swatches of the 50% and 35% cotton fabrics were padded to about 100% wet pickup with Solution O. These fabrics were dried for 7 minutes at 60° C. and cured for 3 minutes at 120° C. After curing and washing, durable press ratings after tumble drying also were made as in Example 4. Results are shown in Table V.

TABLE V

| Treatment Solution | Durable Press Rating, Tumble Dried % Cotton in Fabric | | |
|---|---|---|---|
| | 100 | 50 | 35 |
| M | 1.9 | 3.6 | 3.3 |
| N | 3.2 | 4.3 | 4.0 |
| O | — | 3.9 | 4.0 |

These results demonstrate the greater effectiveness of the hydroxymethanesulfonic acid catalyst as prepared in Example 1 over that resulting from in situ conversion of sulfurous acid and the free formaldehyde in the pad bath to hydroxymethanesulfonic acid for imparting durable press appearance with a dimethylol dihydroxyethyleneura finishing agent. It is also demonstrated that the improved catalyst is effective with N-methylol finishing agents on textiles that contain 35% or more cotton.

We claim:

1. A process for the treatment of cellulose containing textiles to give durable press properties in which odor-free hydroxymethanesulfonic acid is employed as catalyst in the absence of sulfurous acid and $HSO_3^-$ cation, said process consisting of:
    a. preparing hydroxymethanesulfonic acid by dissolving 2.3 parts of paraformaldehyde at room temperature in 6.3 parts of sulfurous acid in sufficient water to give 8.4 parts of odor-free hydroxymethanesulfonic acid;
    b. adding about from 0.04 to 0.2 part of the hydroxymethanesulfonic acid to a solution containing from 9 to 15 parts of an N-methylol finishing agent selected from the group consisting of dimethylol methyl carbamate and dimethylol hydroxyethyleneurea, and making the solution to 100 parts;
    c. impregnating a textile material containing at least 35% cotton with the solution from step (b) to apply a finish thereto;
    d. heat treating the impregnated textile to cure the finish; and
    e. washing the cured textile material.

2. The process of claim 1 wherein the N-methylol finishing agent used is dimethylol methyl carbamate.

3. The process of claim 1 wherein the N-methylol finishing agent used is dimethylol dihydroxyethyleneurea.

4. The process of claim 1 wherein the textile material is cotton.

5. The process of claim 1 wherein the textile material is 50% cotton and 50% polyester.

6. The process of claim 1 wherein the textile material is 35% cotton and 65% polyester.

7. The process of claim 1 wherein the heat treatment method is carried out at about 100° C. for about 2.5 minutes without predrying the textile.

8. The process of claim 1 wherein the heat treatment is carried out by first drying the textile at about 60° C. for about 7 minutes and then curing at about 120° C. for about 3 minutes.

* * * * *